(12) United States Patent
Yahnker et al.

(10) Patent No.: US 7,270,910 B2
(45) Date of Patent: *Sep. 18, 2007

(54) THERMAL MANAGEMENT SYSTEMS FOR BATTERY PACKS

(75) Inventors: Christopher R Yahnker, Raleigh, NC (US); Daniele C Brotto, Baltimore, MD (US); Erik A Ekstrom, Woodstock, MD (US); Andrew E Seman, Jr., White Marsh, MD (US); David A Carrier, Aberdeen, MD (US); Steven J Phillips, Ellicott City, MD (US); Michael C Doyle, Baldwin, MD (US); Danh T Trinh, Parkville, MD (US); William D. Spencer, Ellicott City, MD (US); Jeffrey J. Francis, Nottingham, MD (US); Daniel J. White, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/075,179

(22) Filed: Mar. 8, 2005

(65) Prior Publication Data

US 2005/0202310 A1 Sep. 15, 2005
US 2007/0128505 A9 Jun. 7, 2007

Related U.S. Application Data

(63) Continuation-in-part of application No. 10/959,193, filed on Oct. 7, 2004, and a continuation-in-part of application No. 10/954,222, filed on Oct. 1, 2004.

(60) Provisional application No. 60/551,803, filed on Mar. 11, 2004, provisional application No. 60/551,891, filed on Mar. 10, 2004, provisional application No. 60/540,323, filed on Feb. 2, 2004, provisional application No. 60/510,128, filed on Oct. 14, 2003, provisional application No. 60/510,125, filed on Oct. 14, 2003, provisional application No. 60/507,955, filed on Oct. 3, 2003.

(51) Int. Cl.
*H01M 10/48* (2006.01)
*H01M 10/50* (2006.01)
*B25B 21/00* (2006.01)

(52) U.S. Cl. .......................... 429/62; 429/61; 429/90; 429/120; 30/500

(58) Field of Classification Search ............... None
See application file for complete search history.

(56) References Cited

U.S. PATENT DOCUMENTS

| | | | |
|---|---|---|---|
| 4,332,866 A | 6/1982 | Jacquelin et al. |
| 5,153,449 A | 10/1992 | Crook et al. |
| 5,218,256 A | 6/1993 | Umezawa et al. |
| 5,449,571 A | 9/1995 | Longardner et al. |
| 5,480,734 A | 1/1996 | Schulz et al. |
| 5,663,011 A | 9/1997 | Bunyea et al. |
| 6,222,343 B1 | 4/2001 | Crisp et al. |

(Continued)

*Primary Examiner*—Jonathan Crepeau
(74) *Attorney, Agent, or Firm*—Harness, Dickey & Pierce, P.L.C.

(57) ABSTRACT

A cordless power tool has a housing which includes a mechanism to couple with a removable battery pack. The battery pack includes one or more battery cells as well as a system to dissipate heat from the battery pack.

26 Claims, 13 Drawing Sheets

U.S. PATENT DOCUMENTS

| | | |
|---|---|---|
| 6,455,186 B1 | 9/2002 | Moores, Jr. et al. |
| 6,543,549 B1 | 4/2003 | Riedl et al. |
| 6,599,656 B2 | 7/2003 | Cittanova |
| 6,605,926 B2 | 8/2003 | Crisp et al. |
| 6,645,666 B1 | 11/2003 | Moores, Jr. et al. |
| D483,012 S | 12/2003 | Hsu |
| 6,701,604 B2 | 3/2004 | Zeiler et al. |
| 6,840,335 B1 | 1/2005 | Wu |
| 2003/0052651 A1 | 3/2003 | Crisp et al. |
| 2003/0096158 A1* | 5/2003 | Takano et al. ............... 429/90 |
| 2004/0106036 A1 | 6/2004 | Geis et al. |
| 2004/0171299 A1 | 9/2004 | Zeiler et al. |
| 2004/0227308 A1 | 11/2004 | Long et al. |
| 2004/0242043 A1 | 12/2004 | Buck et al. |
| 2004/0247996 A1 | 12/2004 | Smith et al. |
| 2004/0257038 A1 | 12/2004 | Johnson et al. |
| 2004/0263119 A1 | 12/2004 | Meyer et al. |
| 2005/0007068 A1 | 1/2005 | Johnson et al. |
| 2005/0024021 A1 | 2/2005 | Zeiler et al. |
| 2005/0073282 A1* | 4/2005 | Carrier et al. .............. 320/106 |
| 2005/0077878 A1* | 4/2005 | Carrier et al. .............. 320/134 |

* cited by examiner

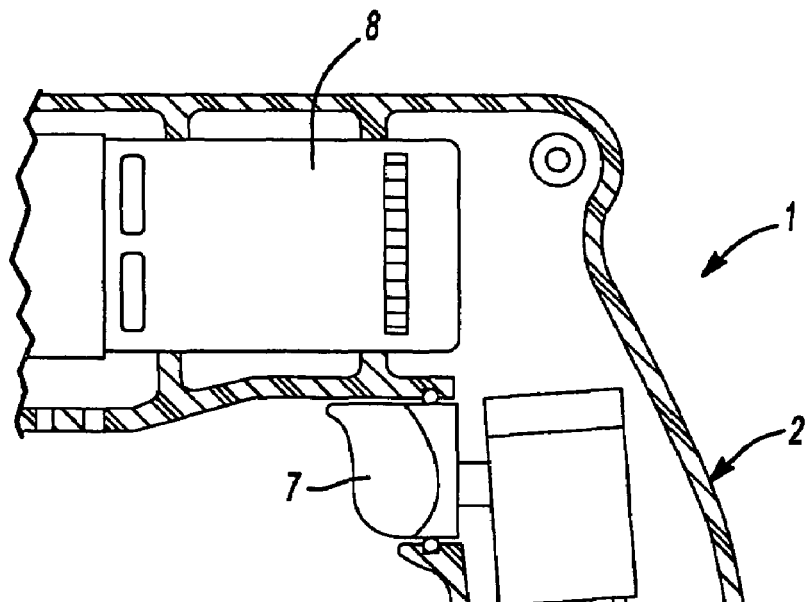
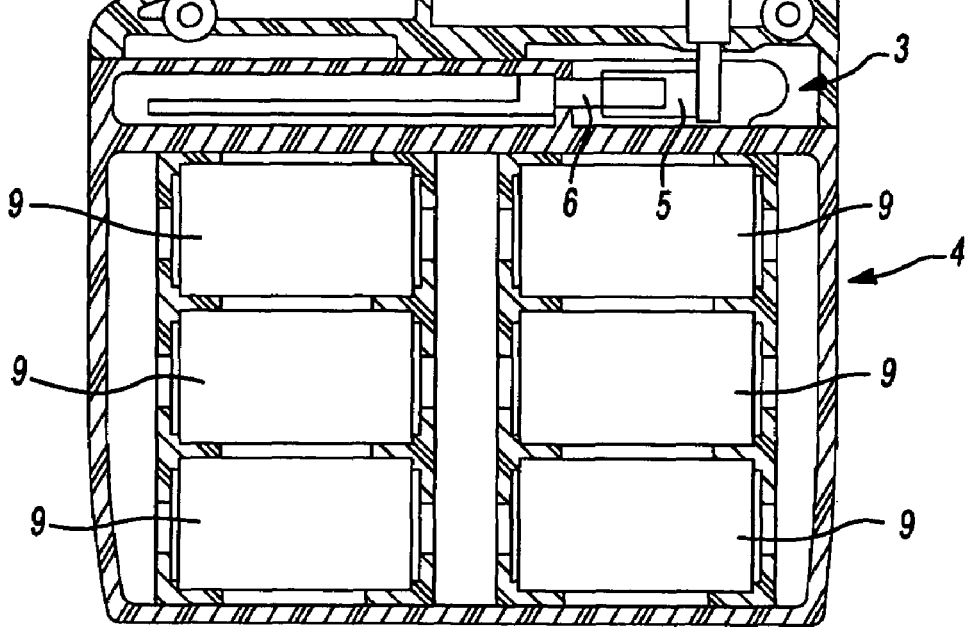
Fig-1A

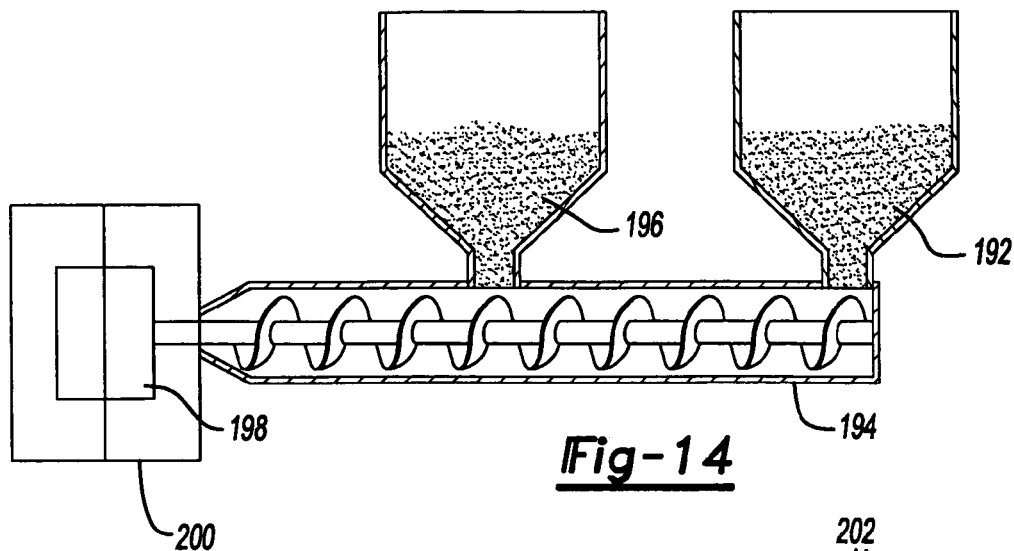
*Fig-14*
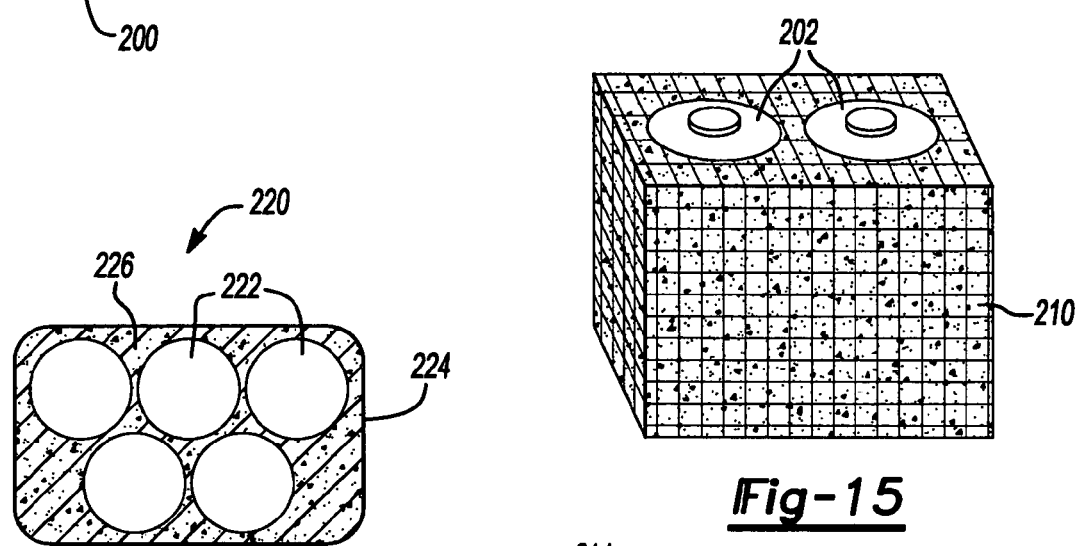
*Fig-15*
*Fig-16*
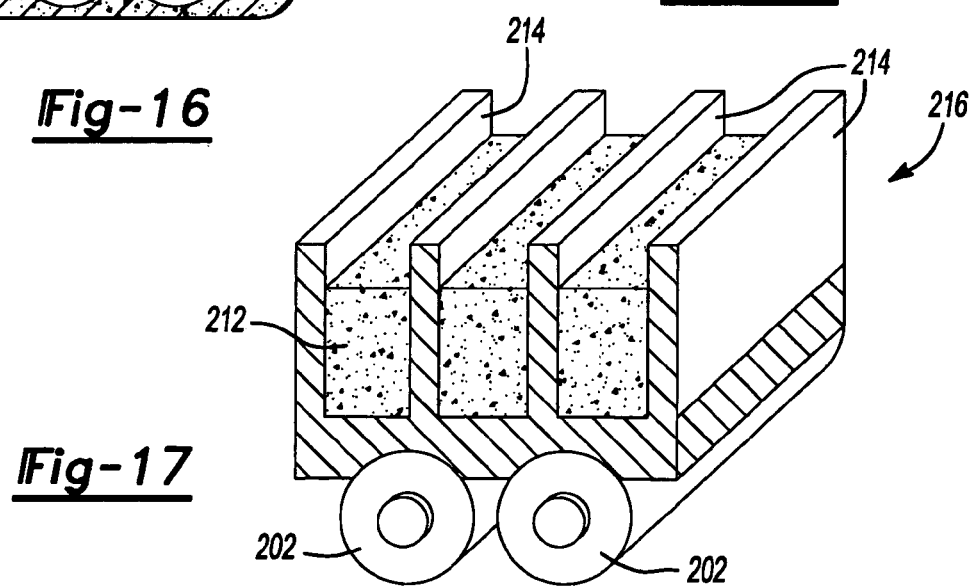
*Fig-17*

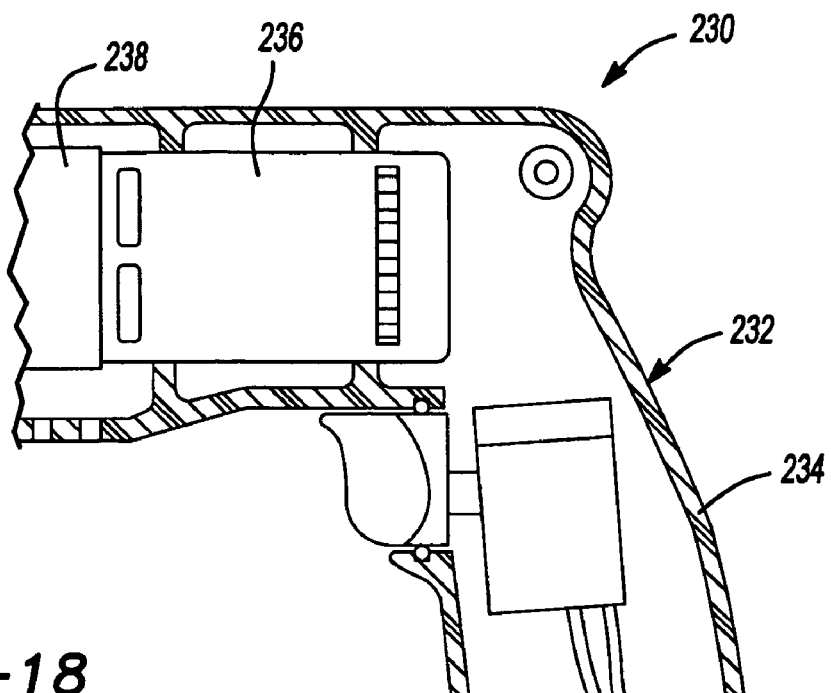
*Fig-18*
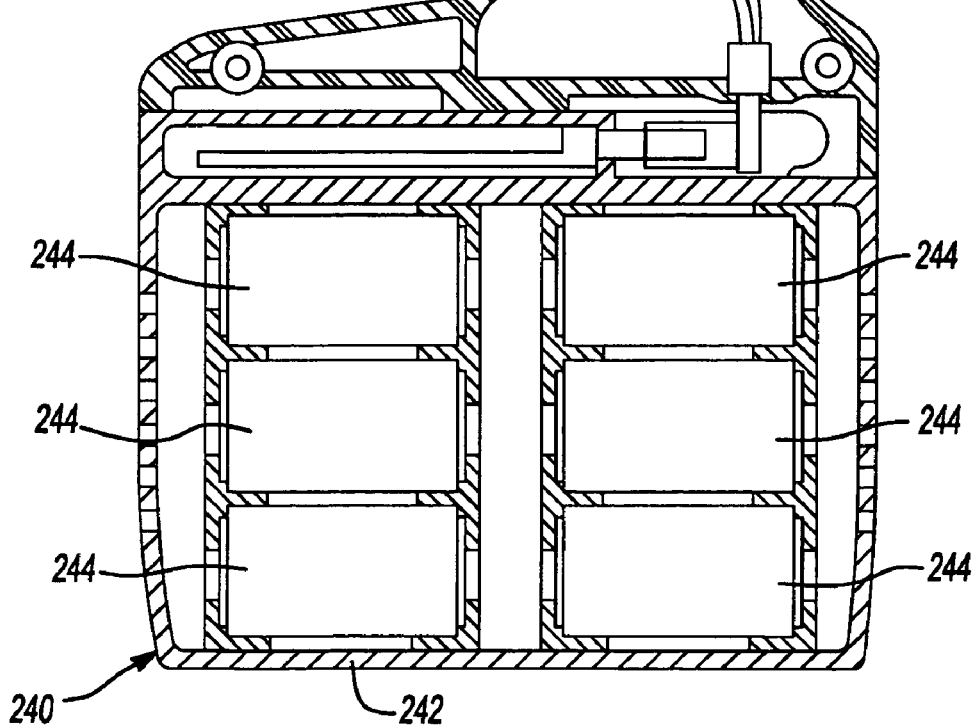

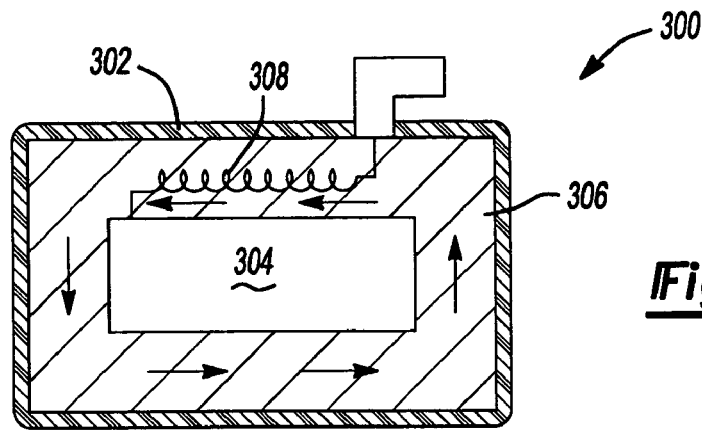
*Fig-23*
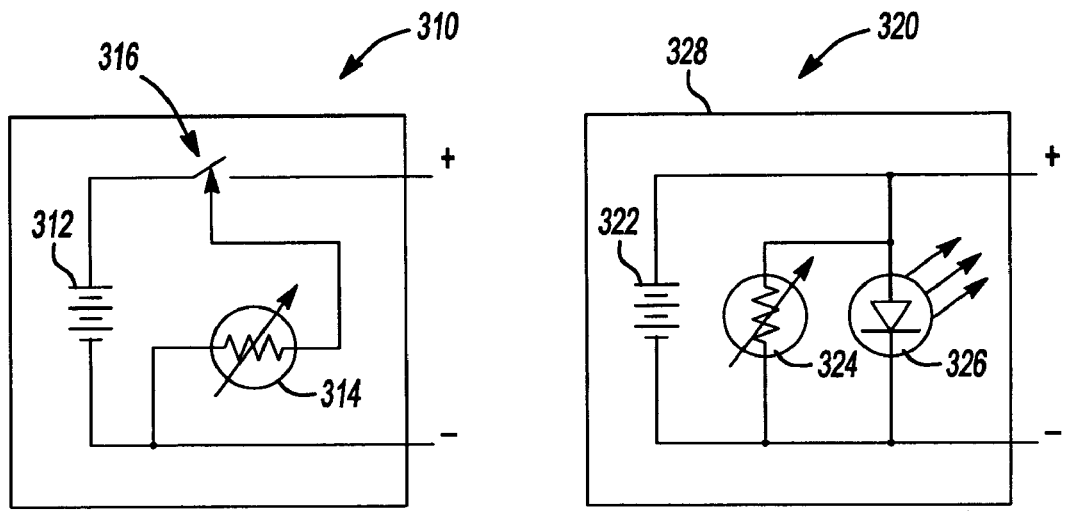
*Fig-24*  *Fig-25*
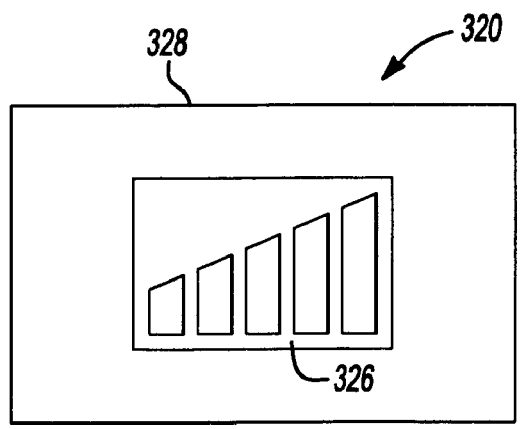
*Fig-26*

THERMAL MANAGEMENT SYSTEMS FOR BATTERY PACKS

CROSS-REFERENCE TO RELATED APPLICATIONS

This application claims the benefit of U.S. Provisional Application No. 60/551,891, filed on Mar. 10, 2004, the disclosure of which is incorporated herein by reference. This application is a continuation-in-part of U.S. application Ser. No. 10/959,193, filed Oct. 7, 2004, which claims the benefit of U.S. Provisional Application No. 60/510,128, filed Oct. 14, 2003, and U.S. Provisional Application No. 60/551,803 filed Mar. 11, 2004. This Application is a continuation-in-part of U.S. application Ser. No. 10/954,222, filed Oct. 1, 2004, which claims the benefit of U.S. Provisional Application No. 60/507,955, filed Oct. 3, 2003, U.S. Provisional Application No. 60/510,125, filed Oct. 14, 2003, and U.S. Provisional Application No. 60/540,323, filed Feb. 2, 2004.

FIELD OF THE INVENTION

The present invention relates to battery cooling systems and, more specifically, to systems for cooling batteries for cordless power tools.

BACKGROUND OF THE INVENTION

Cordless products which use rechargeable batteries are prevalent throughout the workplace as well as in the home. From housewares to power tools, rechargeable batteries are used in numerous devices. Ordinarily, nickel-cadium or nickelmetal-hydride battery cells are used in these devices. Since the devices use a plurality of battery cells, the battery cells are ordinarily packaged as battery packs. These battery packs couple with the cordless devices and secure to the device. The battery pack may be removed from the cordless device and charged in a battery charger or charged in the cordless device itself.

As the cordless power device is used, current flows through the batteries to power the cordless device. As current is drawn off the batteries, heat is generated within the battery pack. Also, during charging of the battery pack, heat is likewise accumulated during the charging process. The heat created during discharge of the batteries as well as charging of the batteries which, in turn, leads to increased temperatures, may have a severe effect on the life expectancy and performance of the batteries. In order for batteries to properly charge, the batteries must be below a desired threshold temperature and the differential temperature between the cells in the battery pack should be minimized. Likewise, if the batteries become too hot during use, battery life will be cut short. Also, if a battery is below a certain threshold temperature, it will be too cold to charge and must be warmed before charging. Thus, it is desirous to maintain batteries within a desired temperature range for optimum performance as well as optimum charging.

Further, battery packs typically contain some battery cells close to the outer walls of the pack, while some battery cells are surrounded by other battery cells. Those cells close to the outer walls have better thermal conductivity to the outside ambient than do the cells that are surrounded by other cells. When a battery pack is discharging on the cordless device, the amount of heat generated is approximately the same in each cell. However, depending on the thermal path to ambient, different cells will reach different temperatures. Further, for the same reasons, different cells reach different temperatures during the charging process. Accordingly, if one cell is at an increased temperature with respect to the other cells, its charge or discharge efficiency will be different, and, therefore, it may charge or discharge faster than the other cells. This will lead to a decline in the performance of the entire pack.

SUMMARY OF THE INVENTION

The present invention provides the art with a battery pack which dissipates heat within the battery pack during charging of the cells as well as during discharging of the cells while the battery pack is in use.

In accordance with a first aspect of the present invention, a heat exchange plate is provided in contact with the cells of the battery pack and at least one fluid passage is provided in contact with the at least one plate and in communication with a fluid source. A pump is provided for carrying a cooling fluid through the plate for withdrawing heat from the battery pack.

According to a second aspect of the present invention, a heat pipe is provided in contact with a cooling plate which is in heat exchange contact with the cells of the battery system. The heat pipe withdraws heat from the battery pack by a wicking process.

According to yet another aspect of the present invention, a fluid is disposed in a battery pack housing and in surrounding contact with the cells of the battery pack. The battery pack housing includes at least one heat conductor metal plate in contact with the fluid and exposed to an exterior of the housing. According to a still further aspect of this invention, a stirring mechanism is provided for stirring the fluid within the housing for enhancing the cooling affect of the fluid around the cells. According to yet another embodiment of the present invention, the fluid around the cells is withdrawn and a cooled fluid can be inserted into the housing for cooling the cells.

According to still another aspect of the present invention, a $CO_2$ cartridge is utilized in proximity to the cells of a battery pack and is adapted to discharge when a temperature of the cells exceeds a predetermined temperature so as to cool the cells. The discharge of $CO_2$ from the cartridge is controlled or can be provided with a full release when it is determined that rapid cooling is required.

According to still another aspect of the present invention, a gel blanket or tubular sleeve containing a gel material with microphase change crystals is provided against the battery cells. The phase change materials maintain the battery pack at the melting temperature of the phase change material. As a material changes phase, the temperature remains constant until the change has completely occurred. Thus, the temperature of the gel surrounding the battery cells can be maintained at a constant temperature for a prolonged period of time while the phase-change materials begin to change phase. The phase change occurs at a relatively constant temperature, maintaining the temperature of the cells below their specified maximum operating temperature. According to still further aspects of the present invention, the microphase change crystals can also be disposed in a plastic material used for a cell carrier of the battery cells or battery pack housing, or can be used with other heat conductive materials, such as aluminum, copper, and carbon fiber so that the phase change materials form part of a heat sink for conducting heat away from the battery cells. The use of phase change materials can also be utilized with a powder material, wax material, or a slurry for suspending the phase change materials in the housing around the battery cells.

According to another aspect of the present invention, a power tool is provided including a plastic tool housing including a handle portion. A motor and drive mechanism are disposed in the tool housing. A battery pack is provided with a metal battery housing releasably attached to the handle portion and having a plurality of cells disposed in the metal battery housing. The metal battery housing acts as a heat conductor for conducting heat away from the battery cells.

According to another aspect of the present invention, a battery system is provided, including a plurality of cells disposed in a battery housing with the cells being movable within the housing so that different ones of the plurality of cells can be moved into and away from a cooling portion of the battery housing. The cooling portion can include a cooling feature, such as a heat sink, or otherwise actively cooled area.

According to yet another aspect of the present invention, a power tool is provided with a tool housing including a handle portion. A motor and drive mechanism are disposed in the tool housing, and a first fan is disposed in the tool housing for providing cooling of the motor. A battery housing is releasably connected to the tool housing and includes a plurality of cells disposed in the battery housing. A second fan is disposed in the battery housing for cooling the plurality of cells within the battery housing.

According to yet another aspect of the present invention, a power tool is provided including a tool housing including a handle portion. A motor and drive mechanism are disposed in the tool housing, and a battery housing is releasably connected to the tool housing. A plurality of cells are disposed in the battery housing, and a cooling system is separately attachable to one of the tool housing and the battery housing for cooling the plurality of cells in the battery housing. The cooling system can include a heat sink, a fan system for blowing air through the battery housing, a liquid cooling system, or other active or passive cooling systems.

According to another aspect of the present invention, the cooling system can also be separately attachable to a battery charger unit and/or the battery housing for cooling the plurality of cells in the battery housing during charging of the plurality of cells.

According to yet another aspect of the present invention, a cooling fluid source is connected to the battery pack housing for providing cooling fluid to the battery pack housing. According to one aspect, compressed air can be supplied as the cooling fluid for cooling the plurality of cells within the battery pack housing.

According to yet another aspect of the present invention, a battery system is provided including a housing having a plurality of cells disposed in the housing. A rheological fluid is disposed in the housing and an inductor coil is disposed in the housing for generating a magnetic field within the housing for causing circulation of the rheological fluid within the housing. The rheological fluid is heat conducting and, therefore, provides cooling of the battery cells as the rheological fluid flows past the cells and conducts the heat away from the battery cells.

According to yet another aspect of the present invention, a temperature sensor is disposed in the battery pack housing for sensing a temperature of the cells within the battery housing. A temperature gauge is disposed on the battery housing for indicating to a user when a temperature in the housing exceeds a predetermined temperature. According to yet another aspect of the present invention, a disable circuit is provided for disconnecting communication with one of a pair of output terminals when a temperature in the housing exceeds a predetermined level.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1A is a cross-sectional view of a typical power tool with which the thermal management systems, according to the principles of the present invention, can be utilized;

FIG. 14 is a schematic illustration of the method of forming the plastic carrier shown in FIG. 13;

FIG. 15 is a diagrammatic perspective view of a heat sink made of conductive material including microphase change crystals for providing a heat sink for cells of a battery pack, according to the principles of the present invention;

FIG. 16 is a diagrammatic view of an exemplary battery pack including a plurality of cells surrounded by a suspension medium including microphase change crystals suspended in the suspension medium according to the principles of the present invention;

FIG. 17 is a perspective view of a heat sink having fins for cooling cells of a battery pack and including phase change material between the fins for enhancing the cooling properties of the heat sink according to the principles of the present invention;

FIG. 18 is a cross-sectional view of a power tool including a plastic housing including a motor within the housing and an integrally formed handle portion, with a battery pack having a metal housing for conducting heat away from the plurality of cells according to the principles of the present invention;

FIG. 23 is a schematic diagram of a battery system including a plurality of cells disposed within a housing and including a rheological fluid within the housing for conducting heat away from the cell cluster;

FIG. 24 is a schematic diagram of a circuit for disabling a battery pack when a temperature of the cells exceeds a predetermined level;

FIG. 25 is a diagram of a circuit for activating temperature gauges disposed on the battery pack for indicating to a user when the pack reaches a predetermined temperature; and FIG. 26 is a diagrammatic illustration of a battery pack for a power tool including a temperature gauge disposed on the exterior of the battery pack according to the principles of the present invention.

DETAILED DESCRIPTION OF THE PREFERRED EMBODIMENTS

Figure 1B:
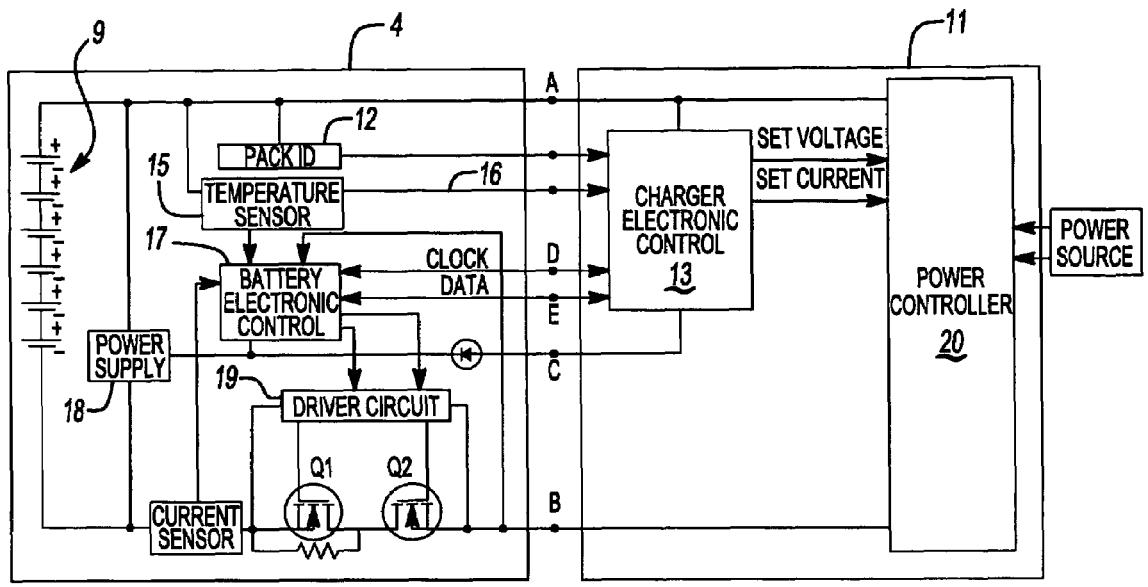
FIG. 1B is a schematic system diagram of the functional control of the battery pack and battery charger according to the principles of the present invention.

The following description of the preferred embodiment(s) is merely exemplary in nature and is in no way intended to limit the invention, its application, or uses.

With reference to FIG. 1, a cordless device, such as a power tool, is illustrated and designated with reference numeral 1. The cordless device 1 ordinarily includes a clam shell type housing 2. The housing 2 includes a mechanism 3 to couple the housing 2 with a battery pack 4. The cordless device 1 includes electrical elements 5 which couple with corresponding electrical elements 6 of the battery pack 8. The device 1 includes a trigger 7 which is activated for energizing a motor 8 provided within the housing 2, as is well known in the art. Normally, a plurality of battery cells 9 are disposed within the battery pack 4.

With reference to FIG. 1B, the functional control features of a battery pack 4 and battery charger 11, according to the principles of the present invention, will be described. The power connections for charging and discharging the battery pack 4 are through terminals A and B. Inside the battery pack 4 there is a pack ID (identification) component 12 which, when used with the charger 11 or tool 1, can define the battery's chemistry, capacity, and/or other battery characteristics to either the charger's electronic control unit 13 or the tool electronic control unit 14 (see FIG. 1C). Battery pack 4 also has one or more temperature sensor (such as a thermistor) 15 connected to both the charger unit 11 via connector 16 and the electronic control 17 inside the battery pack 4. The electronic control 17 is responsible for the protection of the cells 9 for any condition exposed on the terminals A, B by the user (charger, tool, and/or user tampering). The discharge or charge current can be clamped or discontinued by the use of the semi-conductor devices Q1 and Q2. The electronic circuit is powered by an internal power supply 18 as shown and the semi-conductor devices Q1, Q2 are linked through a driver circuit 19.

When connected to a charger unit 11, the charger electronic control 13 can be powered from the battery's power supply 18 through terminals A and C. This is only exemplary as other means for powering the charger electronic control 13 can be employed. Battery and charger information can be exchanged through serial data on terminal D and E. The charger electronic control 13 then will drive the power controller 20 to deliver the desired voltage and current to the battery pack 4.

Figure 1C:
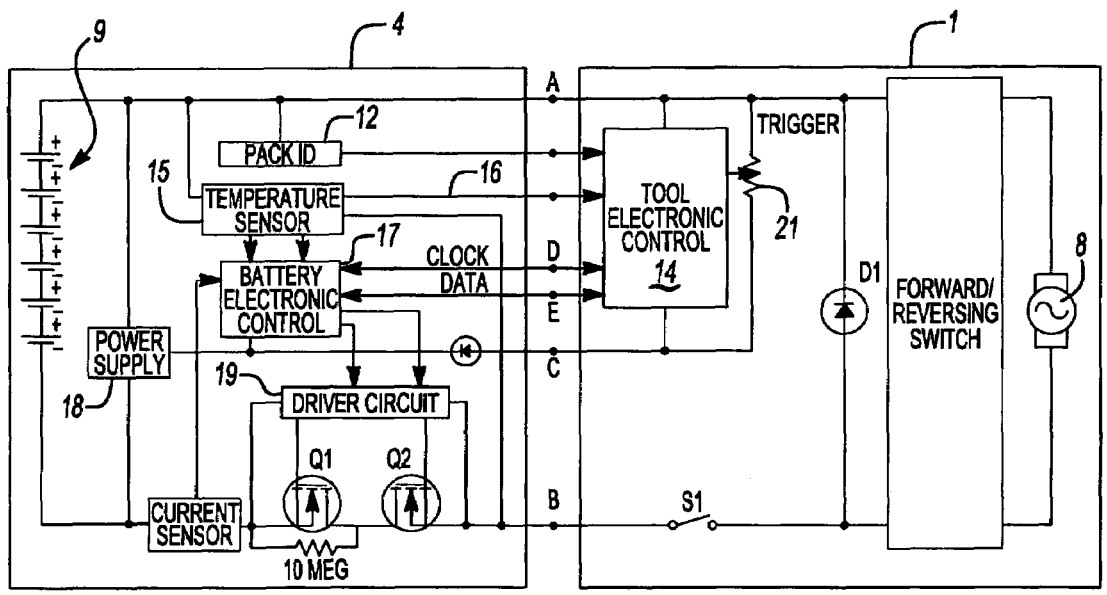
FIG. 1C is a schematic system diagram of the functional control of the battery pack and tool according to the principles of the present invention.

With reference to FIG. 1C, the battery pack 4 is shown connected to a smart tool 1. The tool 1 also has an electronic control 14 that can be powered from the battery power supply 18 through terminals A and C. The tool 1 contains a mechanical switch S1 that pulls terminal B high when the semi-conductor Q1 is off. If semi-conductor Q1 is left off while the battery pack 4 is dormant, and suddenly the trigger 21 is pulled, terminal B could be used to wake the battery pack 4 from a dormant mode of operation. The tool electronic control 14 could be programmed to read the trigger 21 position and report that data back to the battery electronic control 14 through serial line D and E. The battery electronic control 14 will vary the PWM duty cycle through semi-conductor Q1 to obtain a desired motor speed in the tool 1. While semi-conductor Q1 is off, the diode D1 in the tool 1 will re-circulate any inductive motor current to prevent voltage spikes.

An alternative tool not having a smart controller (not shown) may just have the trigger switch 21 configured as a potentiometer and connected to terminals A, D or E, and C. The battery electronic control 17 would then command the semi-conductor Q1 to switch at the desired duty cycle to create the intended motor speed. Even less intelligent tools could exist as on/off tools. These require only the connection to terminals A and B for operation.

The present application is directed to several methods of managing the thermal environment around the battery cells of a battery pack as used in a power tool and during charging of the batteries when applied to a battery charger unit.

Figure 2:
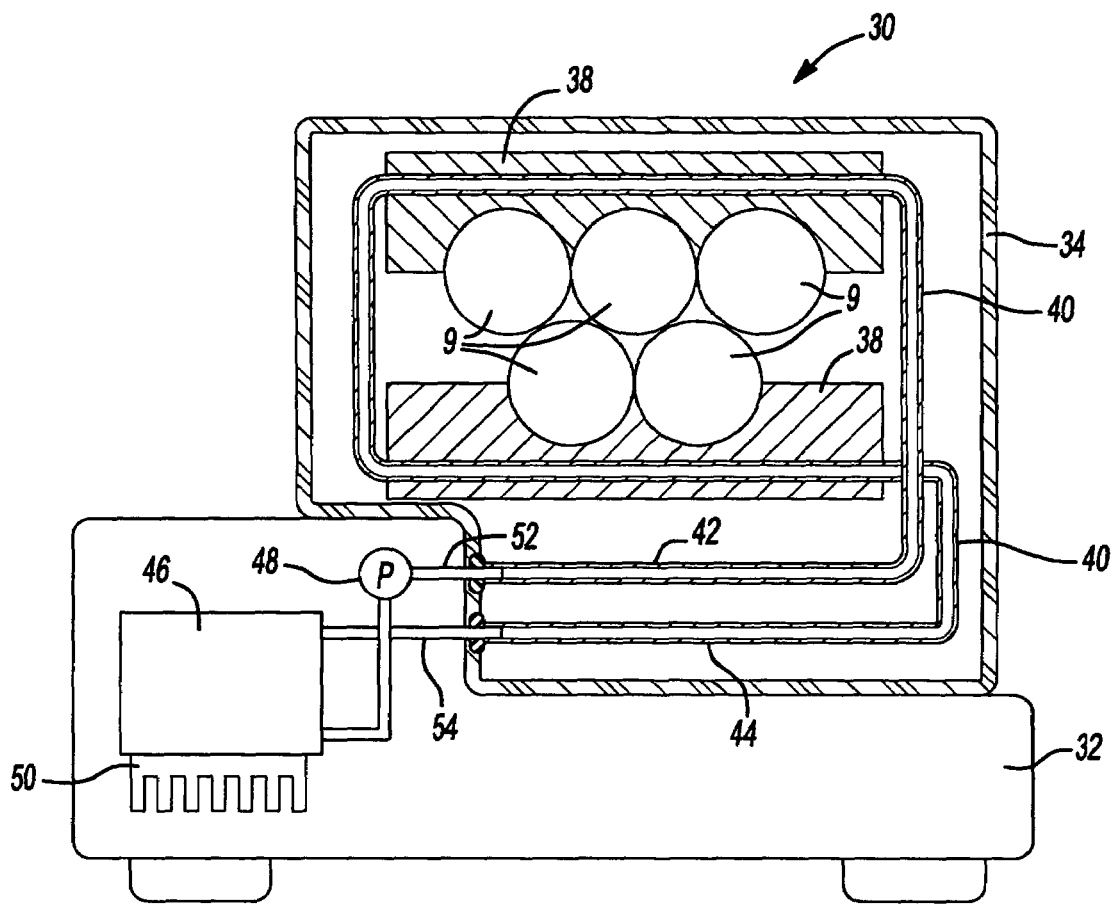
FIG. 2 is a cross-sectional view of a battery pack and battery charger unit having a liquid cooling system according to the principles of the present invention.

With reference to FIG. 2, a battery pack 30 is provided in connection with a charger unit 32. The battery pack 30 includes a housing 34 having a plurality of battery cells 9 mounted therein. The battery cells 9 may be disposed between a pair of metal plates 38 which are sandwiched on opposite sides of the battery cells 9. The plates 38 may be provided with liquid passages 40, including an inlet passage 42 and an outlet passage 44, which extend through the plates 38. The passages 40 are either metal (such as copper, aluminum, etc.) tubing or heat pipes running through the plates 38. As the cells 9 heat up, the plates 38 will act as heat sinks for the heat that is generated. The copper tubes or heat pipes 40 are used to carry the heat away from the plates so they never reach temperature equilibrium with the cells. Since they never reach equilibrium, they can continuously carry heat away.

For the system utilizing metal tubes, a fluid such as water is pumped from a reservoir 46 provided in the charger unit 32 by a pump 48. The heat exchanger 50 may be provided for extracting heat from fluid returned to the storage vessel 46. The heat exchanger 50 can include fins for increasing the heat transfer, or alternatively, an active cooling system such as a refrigeration system or fan can be utilized for withdrawing heat from the fluid in the storage vessel 46. The inlet and outlet 42, 44 of the fluid passages 40 in the battery pack 30 can be connected to corresponding tubing in the charger unit 32 in order to provide a fluid connection with the fluid passage 52 coming from pump 48 and the return passage 54. If the system of FIG. 2 is utilized including heat pipes, the heat pipes would be terminated into a heat sink mounted within the charger unit or the battery pack. When the battery pack is placed in the charger, a fan would blow air through the heat sink to carry the heat generated in the pack into the air.

For the fluid cooling method using metal tubes, heat transfer is dependent on the mass flow rate of the fluid. A higher volume of fluid increases the amount of heat that can be carried away. By tailoring the flow rate or tube size, the heat transfer capability can be changed. The flow rate can also be changed based on temperature inputs from the pack. Heat transfer is dependent on the working fluid. The working fluid could be selected so that it maximizes performance across all temperature ranges and environmental conditions while maintaining low cost and high reliability. The copper tube method could be reversed to heat the pack if the pack is below the minimum charging temperature. Because the movement and type of fluid can be completely controlled, this method has a greater capacity to remove heat than the heat pipe method. If the working fluid is cooled below ambient, for example, by using a refrigeration device, there is a greater capacity for removing heat from the pack.

The heat pipe method also has numerous advantages. The heat pipe method is a completely enclosed system that does not require fluid to move across the pack/charger boundary. If multiple independent heat pipes are used in the system, the system would continue to work if the pack/cooling system was damaged. The heat pipe system is simpler in that heat pipes create fluid flow through a wicking method. This eliminates the need for pumps or methods to create fluid flow. Because air cooling from the charger is still required to cool the heat sink where the heat pipes terminate, it is possible to combine this system with a traditional fan cooled system to enhance pack cooling further.

The above two systems could also be adapted to work while the pack is in the tool.

Figure 3:
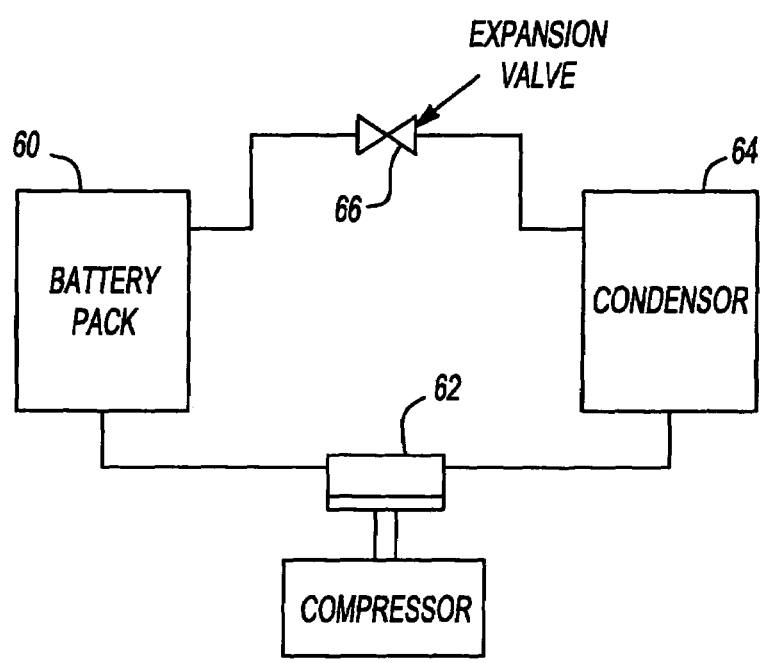
FIG. 3 is a schematic diagram of a refrigeration system for cooling a battery pack according to the principles of the present invention.

With reference to FIG. 3, a battery pack 60 is provided along with a refrigeration system for cooling the battery cells within the pack 60. The refrigeration system may be provided within a charger unit for cooling the pack during recharge of the battery pack. In this system, the battery pack 60 acts as the evaporator in a standard refrigeration cycle. The refrigerant is compressed by a compressor 62. It is then passed to a condenser 64 where excess heat is removed and the coolant is liquefied. From the condenser 64, the liquid coolant is passed to an expansion valve 66 where it is throttled to a sub-cooled liquid. The liquid then passes into interior passages in the battery pack 60 where it is evaporated to a gas by absorbing heat from the pack 60. The vapor then passes back to the compressor 62 to repeat the cycle.

The refrigeration system, as illustrated in FIG. 3, can be employed in the charger unit 32, as illustrated in FIG. 2, wherein the compressor, condenser, and evaporator 66 are each disposed within the battery charger unit. The connection with the battery pack can be obtained in the same manner as illustrated and described with reference to FIG. 2.

Figure 4:
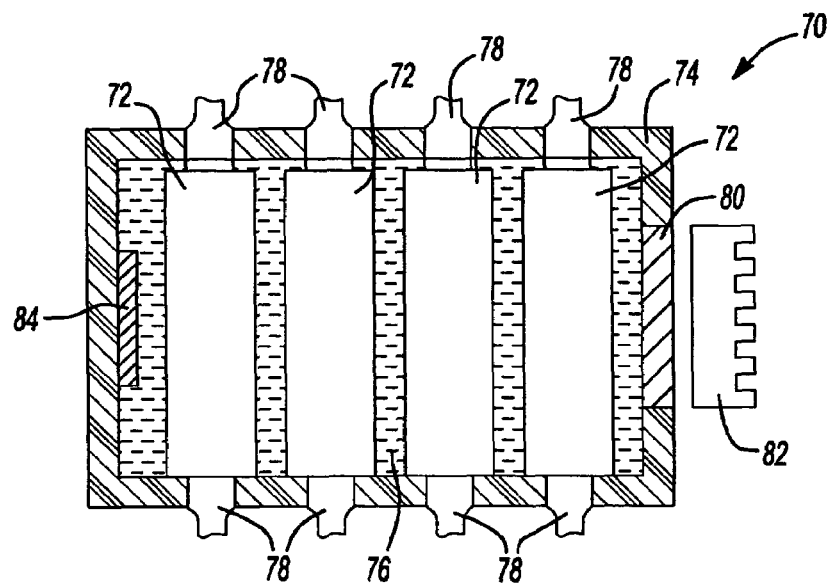
FIG. 4 is a schematic view of a battery pack filled with cooling fluid according to the principles of the present invention.

With reference to FIG. 4, a battery pack 70 is provided including a plurality of battery cells 72 disposed within a housing 74. The housing 74 is filled with a fluid which surrounds the battery cells 72. The housing 74 is provided with a water-tight seal and includes electrical contacts 78 that are insert molded into the plastic enclosure 74. At least one heat conducting plate 80, such as an aluminum plate, may be insert molded into a sidewall of the housing 74 in contact with the fluid 76 for conducting heat from the fluid 76 to the exterior of the housing 74. A heat sink 82 may be provided in contact with the heat conducting plate 80 when the battery pack 70 is inserted into the power tool or received in a battery charger. The heat sink 82 helps to conduct heat away from the heat conducting plate 80 and is provided with fins, or is otherwise passively or actively cooled to provide additional cooling to the heat conducting plate 80. The fluid 76 within the housing 74 is optionally stirred by an ultrasonic device 84 or other device which is turned on by a pack controller 414 to stir the fluid in the enclosure. The stirring of the fluid increases heat transfer form the cells 72 to the fluid 76 and from the fluid 76 to the heat conducting plate 80. The additional mass in the system due to the fluid gives a larger thermal mass that also improves the transient performance of the pack 70. Furthermore, hot spots in the pack 70 are reduced or eliminated due to the improved heat transfer within the system that is being stirred. The cooling system requires little to no energy for the pack 70 to operate. If the stirring device 84 is turned on, its current draw would be low enough so as not to have a significant impact on the run time of the pack 70. The system has the potential to absorb/dissipate a tremendous amount of heat, thereby allowing for high charge and discharge rates. The cooling method includes no moving parts and is, therefore, durable and reliable.

Figure 5:
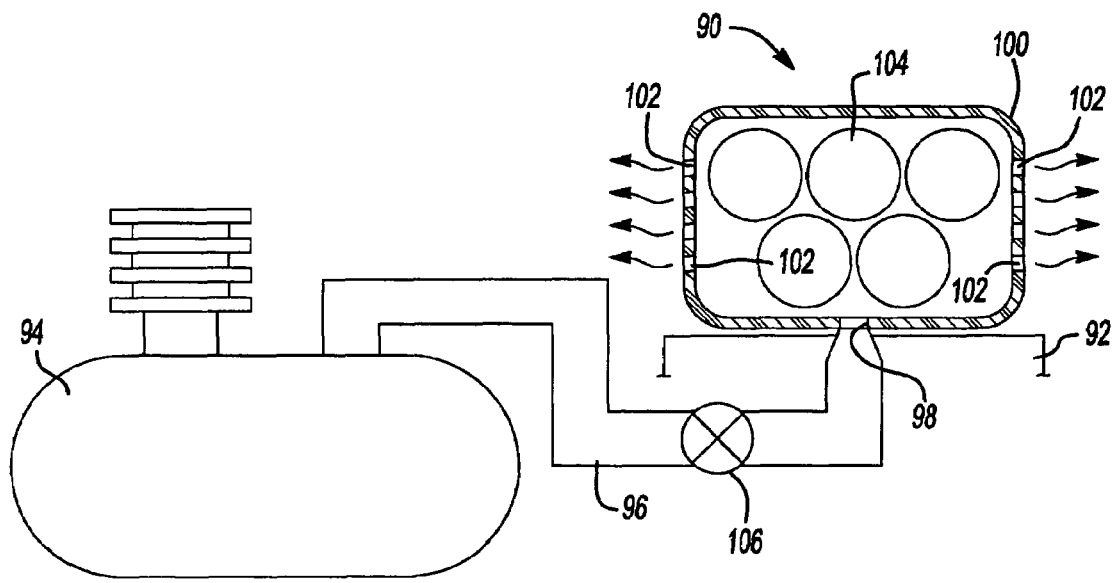
FIG. 5 is a schematic diagram of a system for cooling a battery pack utilizing compressed air according to the principles of the present invention.

With reference to FIG. 5, a battery pack 90 is shown inserted in a battery charger 92. A compressor 94 is provided in connection with the charger unit 92 to provide compressed air through a high pressure air line 96 that introduces high pressure air through a vent passage 98 in the housing 100 of the battery pack 90. The housing 100 may be provided with additional vent passages 102 which allow air to escape from within the battery pack 90 and, therefore, carry away heat from the battery cells 104. It should be understood that the compressor 94 may be provided within the charger or as a separate unit connected to the charger unit 92. A valve 106 can be provided within the charger unit 92 in the high pressure air line for controlling the flow of high pressure air for cooling the pack 90. The charger controller 13 may be used to open and close the valve 106 in response to a detected high temperature. As air passes through the nozzle and expands back to ambient pressure, its temperature will drop. By designing the system such that the temperature can drop below the ambient, the air's ability to carry away heat from the pack is improved.

Another advantage to this method is that as the air passes through the nozzle, its velocity will increase. This, in turn, means that air moving through the pack is moving at higher speed than what would be possible with a fan. By raising the air velocity, the heat transfer coefficient improves allowing for better heat transfer from the pack to the air. Secondly, increasing the air velocity increases the likelihood of turbulence which further improves the air's ability to remove heat.

The compressor 94 which may preferably be of a mini-compressor type could be cycled on and off as necessary to supply air through the pack any time during the charging cycle. This method of cooling may also be provided by providing a nipple on the back of the charger 92 or battery pack 90 that would plug into a portable compressor or shop air system 94. The compressed air cooling system of the present invention improves cooling by using air that has a temperature lower than ambient and utilizes a high velocity air flow. The system is more robust than a standard air cool system that utilizes a fan, and the system can be used to provide cooling at any time during the charge cycle. This compressed air system may be combined with a Hirsch Vortex device to further enhance the cooling by further reducing the air temperature as it passes into the battery pack 90.

Figure 6:
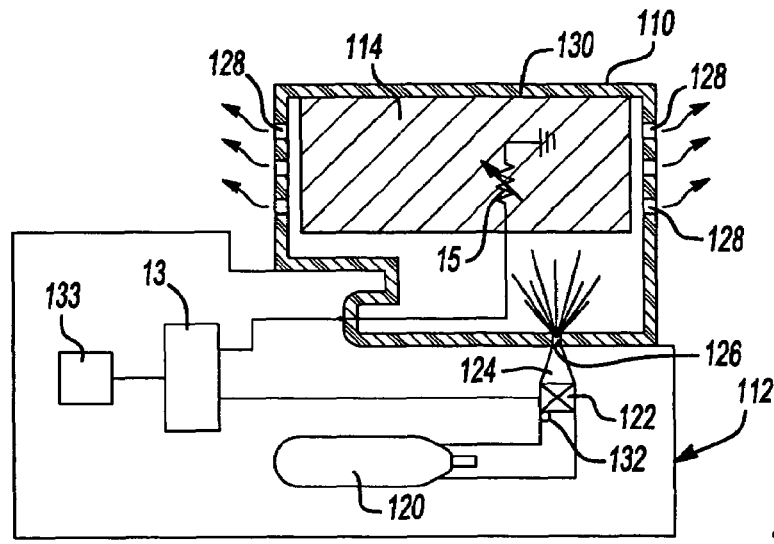
FIG. 6 is a schematic diagram of a system for cooling a battery pack utilizing a $CO_2$ cartridge according to the principles of the present invention.

With reference to FIG. 6, a battery pack 110 is provided in connection with a battery charger unit 112. The battery pack 110 includes a cell cluster 114 and a thermistor 15 which senses the temperature of the cell cluster 114. The thermistor 15 is electrically connected to a control unit 13 provided within a charger unit 112. The charger control unit 13 controls discharge of $CO_2$ from a $CO_2$ cartridge 120 by opening and closing pressure relief valve 122. The pressure relief valve 122 is in communication with a passage 124 which communicates with a passage 126 provided within the housing 130 of the battery pack 110.

When the control unit 13 detects the temperature of the battery pack exceeding a predetermined level (via the signal from thermistor 15), the control unit 13 opens valve 122 to release $CO_2$ into the battery pack 110 for cooling the battery cell cluster 114. The battery pack 110 may include vent passages 128 provided in the housing 130 for allowing escape of the air and $CO_2$ within the battery pack 110. If the pressure is released from the $CO_2$ cartridge 120, the temperature of the gas coming from the cartridge is often less than 0 degrees Celsius. This greatly reduces the ambient temperature in the pack thereby improving the heat transfer from the cells to the ambient. This method of cooling can be controlled by pulsing the pressure release valve 122 on an as-needed basis to maintain the pack in the operating temperature range. Since this method has a finite life due to the limited capacity of the $CO_2$ cartridge, the $CO_2$ cartridge 120 is replaceable with off-the-shelf cartridges. A pressure sensor 132 can be employed with the pressure relief valve 122 for providing pressure signals to the controller 13. When the pressure sensed by the pressure sensor 132 drops below a predetermined level, the control unit 13 can provide a signal to an audible or visual signal device 133 to indicate to a user that the $CO_2$ cartridge needs to be replaced. In addition, the control unit 13 can also deactivate the charger unit so that the charger unit is not utilized until the $CO_2$ cartridge is replaced and the pressure sensed by pressure sensor 132 achieves a predetermined level. The use of a $CO_2$ cooling system provides active cooling for a low cost with few moving parts. Due to the low number of moving parts, the system is highly reliable. The system is user serviceable to minimize down time, and can be constructed using readily available parts and takes up relatively little space.

Figure 7:
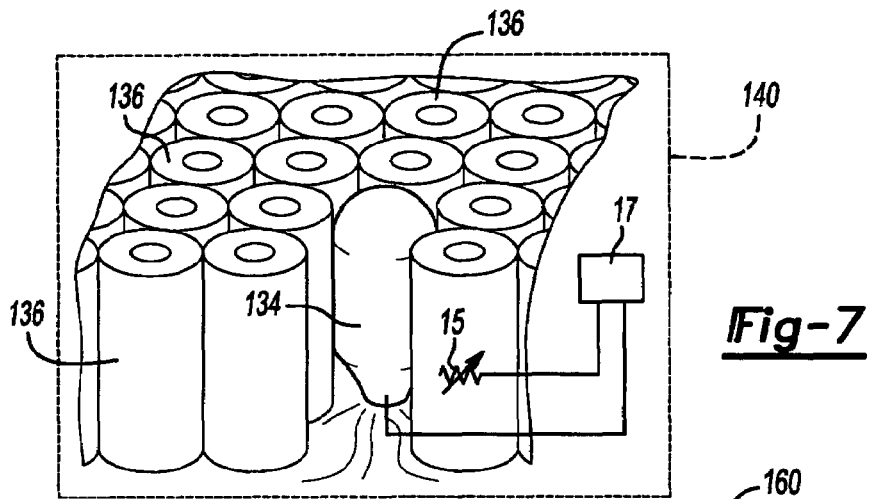
FIG. 7 is a schematic diagram of a battery cooling system for cooling cells of a battery pack utilizing a $CO_2$ cartridge within the battery pack.

With reference to FIG. 7, a similar system is implemented by providing a $CO_2$ cartridge 134 within the battery pack 140 between the cells 136. A controller unit 17 is employed within the pack 140 along with a thermistor 15 for detecting a temperature within the battery pack 140. The control unit 17 controls discharge of $CO_2$ from the $CO_2$ cartridge in the same manner as controller 13, as discussed above. The system of FIG. 7 has two advantages over utilizing the $CO_2$ cartridge in the charger unit. First, the surface at the $CO_2$ cartridge will cool as gas is released, and it can then absorb some of the heat from the battery cells. Second, the system can be activated during discharge as well as during charging of the battery pack 140.

Figure 8:
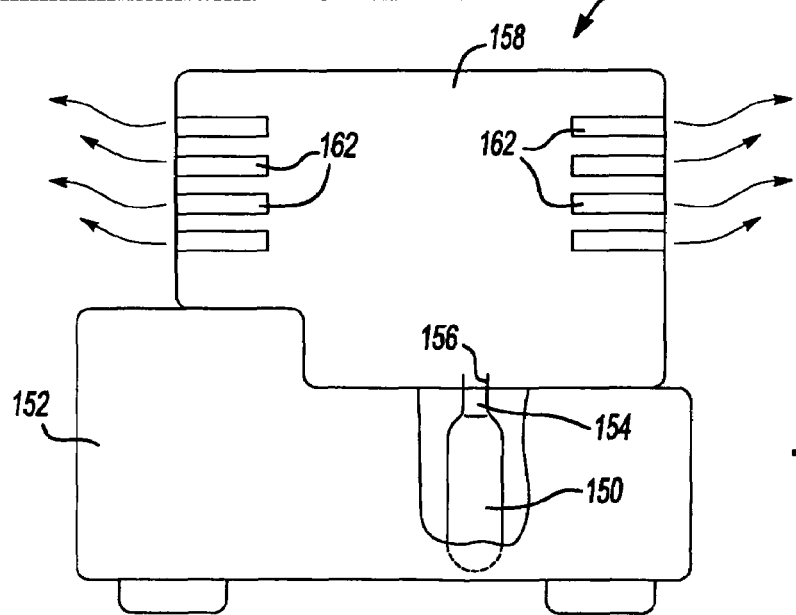
FIG. 8 is a schematic diagram of a battery charger unit including a $CO_2$ cartridge for cooling the battery pack during charging according to the principles of the present invention.

In certain situations, such as overcharge or in extreme environments, certain batteries can go into thermal runaway in which the temperature rapidly increases. In the event that a thermal runaway situation is detected, the high pressure $CO_2$ cartridge can be fully discharged to rapidly cool the cells. As illustrated in FIG. 8, the $CO_2$ cartridge 150 is provided in a charger unit 152 and has a nozzle portion 154 which discharges directly through a passage 156 provided in the housing 158 of a battery pack 160. Vent holes 162 are provided in the sides of the pack housing 158 allowing $CO_2$ to escape from the pack 160 while more $CO_2$ is introduced. The use of $CO_2$ cartridges provides a low cost temperature control device. The $CO_2$ cartridges can be easily replaced by a user. In the event that the $CO_2$ cartridge goes off, the pack input/output can be shut off by the controller until the cartridge is replaced by the user. The use of a $CO_2$ cartridge for discharge during a runaway situation prevents a hazardous situation from occurring. The $CO_2$ cartridge can be placed in the battery pack itself, as illustrated in FIG. 7, or within the charger unit, as illustrated in FIGS. 6 and 8. When the $CO_2$ cartridge is placed within the pack, the $CO_2$ cartridge does not consume much more space than one additional cell.

Figure 9:
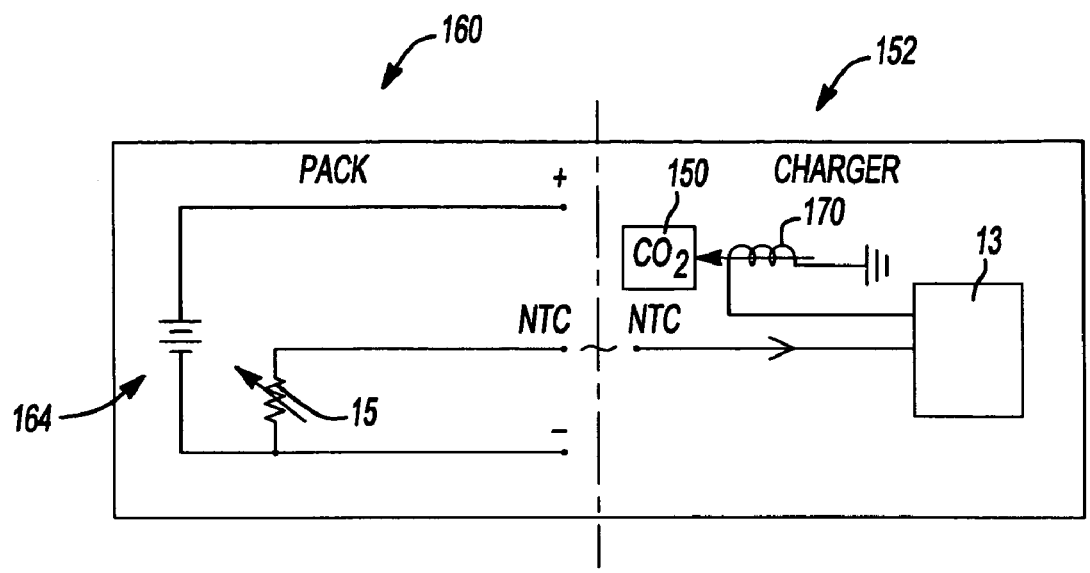
FIG. 9 is a schematic diagram of a control circuit for controlling activation of a $CO_2$ cartridge according to the principles of the present invention

With reference to FIG. 9, a circuit diagram is provided in which the battery cells 164 provided in the battery pack 160 are connected to a charger unit 152. A thermistor 15 is provided for sensing a temperature of the cells 164 and providing a signal to a charger controller 13 provided within a charger unit 152. Upon detection of the battery temperature exceeding a predetermined level, the charger controller 13 sends a signal to activate a solenoid actuation device 170 for discharging $CO_2$ from the $CO_2$ cartridge 150. As illustrated in FIG. 8, the $CO_2$ cartridge has a nozzle communicating with a passage in the battery pack 160 so that the discharged $CO_2$ engulfs the battery cells 164 within the pack 160 for rapid cooling thereof.

Figure 10:
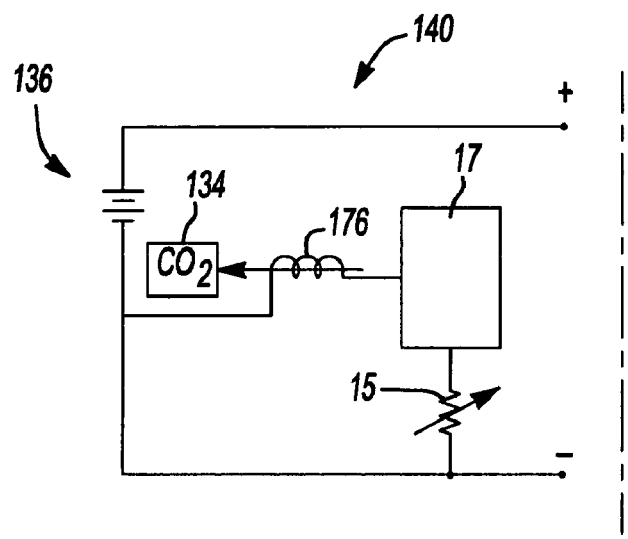
FIG. 10 is a schematic diagram illustrating a control circuit for activating a $CO_2$ cartridge within the battery pack for cooling battery cells of the battery pack according to the principles of the present invention.

With reference to FIG. 10, an alternative embodiment of the control circuit is illustrated in which the $CO_2$ cartridge 134 is disposed within the battery pack 140 and a battery controller 17 receives a signal from a thermistor 15 which detects a temperature of the battery cells 136. Upon detection of a temperature of the battery cells exceeding a predetermined level, the battery controller 17 provides a signal to a solenoid device 176 for actuating the $CO_2$ cartridge 134 to discharge within the battery pack 140 for cooling the battery cells 136. With the setup illustrated in FIG. 10, the $CO_2$ cartridge and controller are fully contained within the battery pack. Here, the temperature is monitored by the controller 17 and if an over-temperature condition is detected, the battery controller 17 activates the solenoid 176 to open the $CO_2$ cartridge 134. With this setup, the $CO_2$ could be released during discharge, for example, to prevent thermal runaway if the pack was shorted. As the $CO_2$ cartridge container itself rapidly cools during discharge, it acts like a heat sink in the pack to draw heat away from the battery cells 136.

Figure 11:
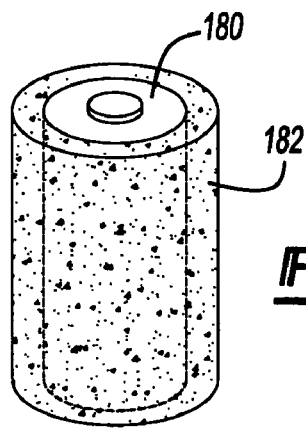
FIG. 11 is a diagrammatic perspective view of a gel tube containing microphase change crystals for cooling of battery cells of a battery pack according to the principles of the present invention.

With reference to FIG. 11, a cooling method is provided which utilizes the latent heat of fusion of a phase-change material to maintain the battery pack at the melting temperature of the phase-change material. As the material changes phase (in this case from a solid to a liquid), the temperature remains constant until the phase change has completely occurred. As illustrated in FIG. 11, a battery cell 180 is provided with a gel tube 182 wrapped around the cell 180. The gel tube 182 is a thin plastic sheet having inner and outer layers that contain a gel solution. The gel is comprised of a fluid medium such as water or other fluids with micro phase-change crystals suspended in the solution. These micro phase-change crystals are 25-50 microns in size and consist of a wax-type material (i.e., paraffin) that is encapsulated in a thermoplastic. As the battery cell 180 gives off heat, the heat is transferred to the gel tube 182. Once the tube reaches the melt temperature of the wax (i.e., 50 degrees Celsius), the phase-change begins. As the wax melts, internal to the thermoplastic shells, it will absorb the heat given off by the cell. Since the gel is able to absorb the heat at the same rate the cell is dissipating the heat, the system will remain at a constant temperature. As long as the amount of micro-phase change crystals used is enough to ensure that the phase change takes longer than the charge or discharge of the battery pack, the system remains below the specified temperature.

Figure 12:
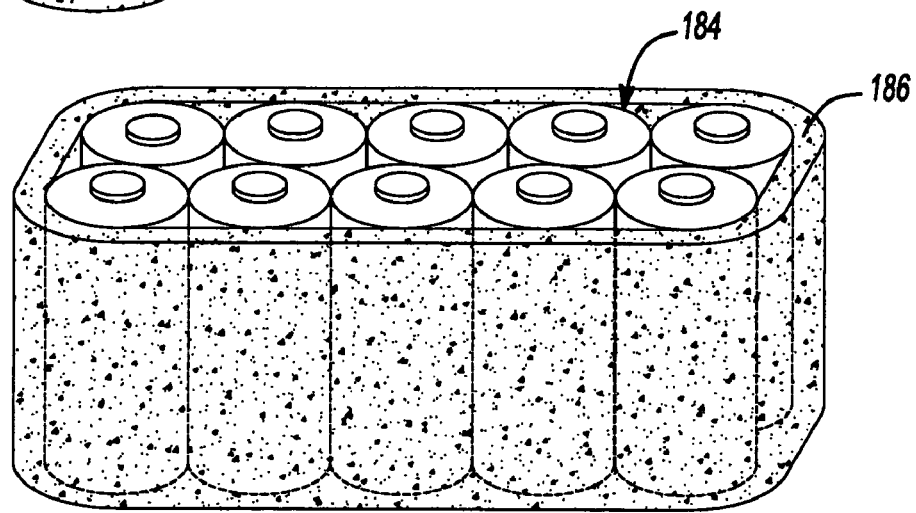
FIG. 12 is a diagrammatic perspective view of a gel blanket containing microphase change crystals for cooling cells of a battery pack according to the principles of the present invention.

With reference to FIG. 12, the same affect can be accomplished by wrapping a cell cluster 184 in a gel blanket 186. Like the tube 182, the blanket 186 contains micro-phase change crystals suspended in a fluid solution for absorbing heat from the entire pack as it heats up. The gel tube or gel blanket cooling system is a passive method of cooling with no moving parts and nothing to wear out. The system is fully contained within the battery pack and does not require any air flow through the pack or heat sinking to the outside of the pack, although heat sinking and air flow can also be utilized in combination with the gel tube or blanket. This system is limited by time by delaying the temperature rise, and is not limited by the amount of heat that can be absorbed. The system can be cycled thousands of times. Once the temperature drops below the melt temperature, the wax re-solidifies allowing the process to repeat. Since the wax is encapsulated within its own shell, there is no expansion of the material as it melts. Since the crystals are suspended in a fluid solution, there is an added benefit in that the thermal run time is extended by having to heat the mass of the fluid solution to the phase transition temperature before beginning the phase transition process.

It is noted that some battery packs include paper or plastic insulating tubes around the cell. The gel tube or gel blanket replaces the paper tube and, therefore, does not take up a significant amount of additional space.

Figure 13:
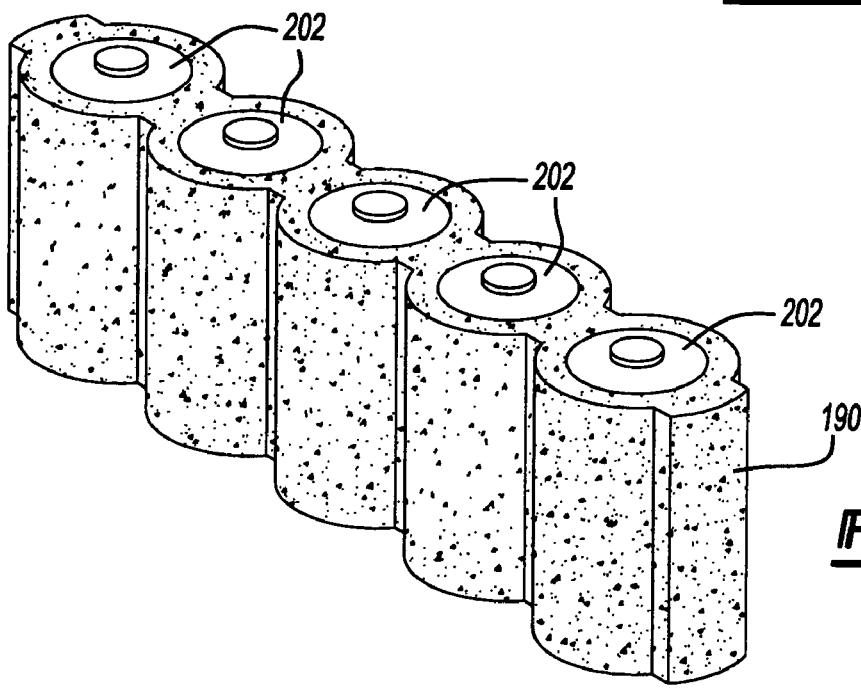
FIG. 13 is a diagrammatic perspective view of a plastic carrier containing microphase change crystals for cooling a plurality of cells according to the principles of the present invention.

With reference to FIG. 13, an alternative system utilizing micro-phase change crystals is provided. The micro-phase change crystals are mixed as a filler to the raw material that the battery housing and cell carriers are made from. As illustrated in FIG. 13, the cell carrier 190 is formed from a thermoplastic material that includes micro-phase change crystals which are suspended in the plastic of the carrier 190. As illustrated in FIG. 14, the thermoplastic material used for making the plastic carrier and battery housing is injected through a conventional screw-type plastic injection molding device 194 into which micro-phase change crystals 196 are introduced near the outlet end of the screw 194. The thermoplastic material 192 mixed with micro-phase change crystals 196 is introduced into a mold cavity 198 of a mold 200 for forming the plastic carrier and/or housing of the battery pack.

As the battery cells 202 generate heat during charge or discharge, the heat is transferred to the carrier 190 and housing where it is absorbed by the wax in the crystals changing state. Since the crystals have a high latent heat capacity, the system is able to absorb the heat at the same rate the cell is dissipating the heat, maintaining the system at a constant temperature. As long as the amount of micro-phase change crystals used is enough to ensure the phase change takes longer than the charge or discharge of the battery pack, the system remains below the specified operating temperature maximum.

The system of FIG. 13 provides a passive method of cooling with no moving parts and nothing to wear out. The cooling system is integrated into the plastic housing eliminating the need to provide additional manufacturing processes to add gel or crystals to the pack. The system is limited by the time required for the phase change crystals to change phase and not by the amount of heat that can be absorbed. The system can be cycled thousands of times. Once a temperature drops below the melt temperature, the wax re-solidifies allowing the process to be repeated. The system could be further enhanced by using thermally conductive plastic to transfer some of the heat to the ambient. The system would work even if the crystals were damaged by the injection molding process or due to pack damage, etc. since the wax is an integrated part of the pack housing.

With reference to FIG. 15, a still further alternative method of utilizing micro phase-change crystals for cooling the battery cells 202 is provided in which micro phase-change crystals are used to form a highly efficient heat sink 210. The heat sink 210 is formed from a heat conductive material such as aluminum, copper, or carbon fiber with micro phase-change crystals dispersed throughout the matrix. The heat sink 210 provides the benefits of both the micro phase-change crystals and the high conductivity metal. As an alternative design as illustrated in FIG. 17, the micro phase-change crystals 212 can be inserted between the fins 214 of an aluminum, copper, or other heat conductive material heat sink 216 which is disposed adjacent to battery cells 202. The use of the micro phase-change crystals between the heat fins again combines the benefits of the two cooling methods. The cooling systems disclosed in FIGS. 15 and 17 provide a passive method of cooling with no moving parts and nothing to wear out. The system is contained within a battery pack, and does not require any air flow through the pack. This system can be cycled thousands of times. Once the temperature drops below the melt temperature, the phase-change crystals re-solidify, allowing the process to repeat.

With reference to FIG. 16, a battery pack 220 is provided with a plurality of cells 222 disposed within a housing 224. The housing 224 is filled with a wax, powder, or other solution 226 which includes micro-encapsulated phase-change material. When the battery cells 222 reach a melting temperature of the micro-encapsulating phase-change material, the micro-encapsulating phase-change material begins to change phase. This phase change occurs at a relatively constant temperature, maintaining the temperature of the cells below their specified operating temperature. The battery housing can be constructed of a metal material, such as aluminum, which would act as a large heat sink for the heat generated in the cells. The heat is conducted through the wax, powder, or solution to the metal housing and is conducted to the ambient. The system of FIG. 16 provides a passive method of cooling with no moving parts and nothing to wear out. The system is fully contained within the battery pack, and does not require any air flow through the pack. This system is limited by time, not by the amount of heat that can be absorbed. The system can be cycled thousands of times and once the temperature drops below the melt temperature, the phase-change material re-solidifies, allowing the process to repeat. When the phase-change material is provided in a slurry solution, the crystals are suspended in a fluid solution, so there is an added benefit in that the thermal run time is extended by having to heat the mass of the fluid solution to the transition temperature before beginning the transition process of the phase change.

With reference to FIG. 18, a power tool 230 is provided with a plastic tool housing 232 including a handle portion 234. A motor 236 and drive mechanism 238 are disposed in the tool housing 232. The drive mechanism 238 can include gear reduction mechanisms, drive shafts, reciprocation devices, etc., as are well known in the power tool art. A battery pack 240 is mounted to the tool housing and includes a metal battery housing 242. The housing 242 includes a plurality of cells 244 disposed therein. The use of a plastic tool housing provides all the benefits of the use of plastics for assembling the tool and molding the housing. The use of a metal battery housing adds the additional heat conducting characteristics of the battery housing to help in removing heat from the battery cells 244.

Figure 19A:
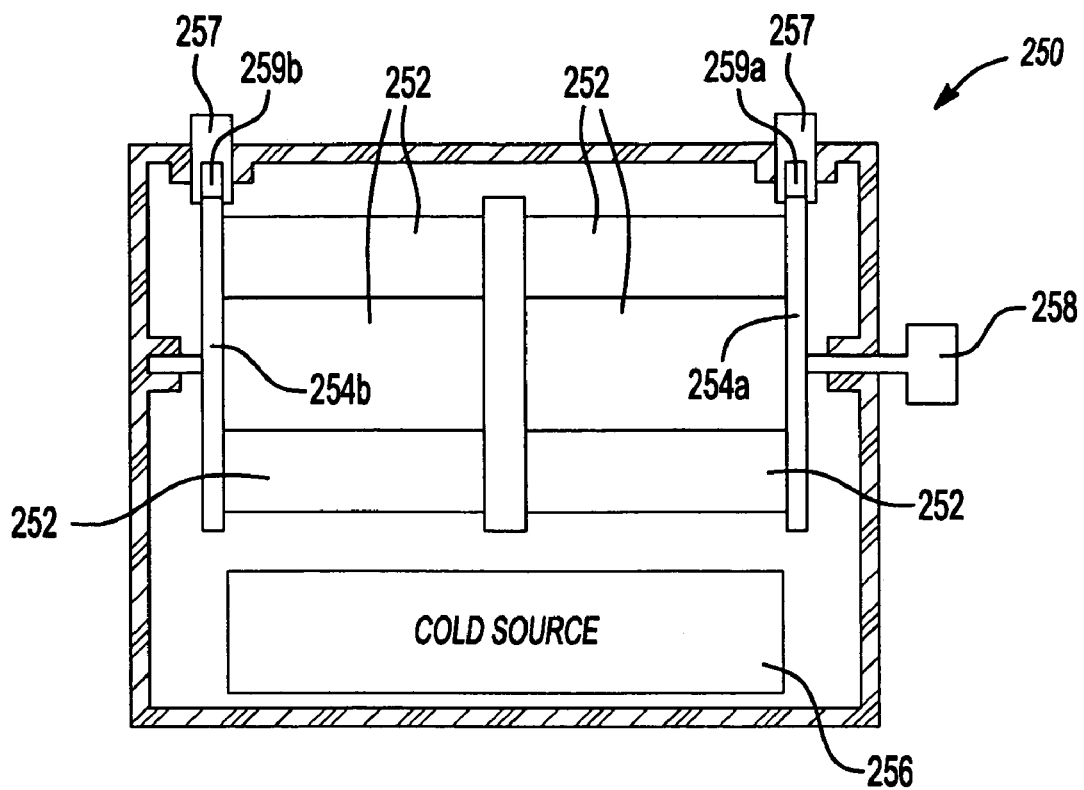
FIG. 19A is a side schematic diagram of a battery pack having a plurality of cells movable within the battery pack for moving the cells from a warm portion of the battery pack to a cooling portion of the battery pack according to the principles of the present invention.
Figure 19B:
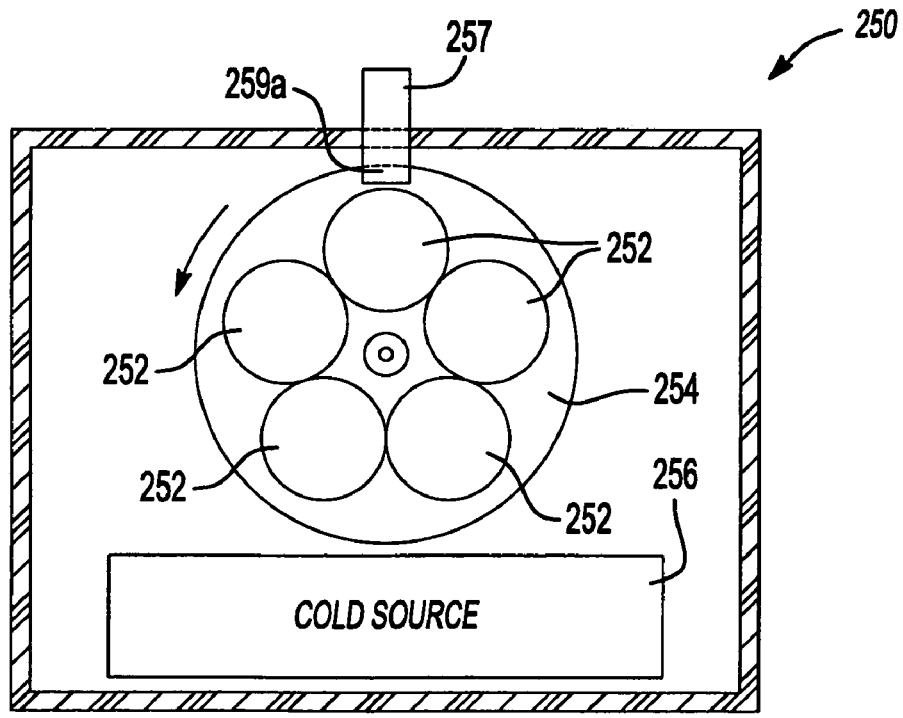
FIG. 19B is a front schematic diagram of the battery pack shown in FIG. 19A.

With reference to FIGS. 19A and 19B, a battery pack 250 is provided with a plurality of cells 252. The cells 252 are disposed on a rotary wheel mechanism 254 which allows the battery cells to be moved from hot portions of the battery pack to cooler portions of the battery pack 250. For example, a cold source 256 such as a heat sink, fan, Peltier device, or liquid cooling system can be employed in one portion of the battery pack 250 so that the cooling feature 256 provides adequate cooling of the cells disposed in the vicinity of the cooling feature. However, additional cells which are not disposed in proximity to the cooling feature may not be properly cooled. Accordingly, the rotary wheel 254 can be rotated to move hot cells from the hot area within the battery pack to a cooler portion of the battery pack in order to remove heat from the cells. It should be understood that the cooling position can include a heat sink or other actively cooled area within the pack 250 where the heat from the hot cells can be extracted and expelled, and the cells within the battery pack can be continually moved or rotated or swapped so that the battery cells are maintained within a predetermined temperature range. The swapping or movement of the cells 252 can be performed manually by rotation of a knob 258 mounted to the rotary wheel 254 upon indication to a user that certain cells have achieved an undesirable temperature, or can be performed automatically by a control system and drive mechanism for driving the rotary wheel 254. Terminal brushes 259$a$, 259$b$ provide an electrical contact between the rotary wheels 254$a$, 254$b$ and terminals 257 to allow the rotary wheel 254 to be rotated.

Figure 20:
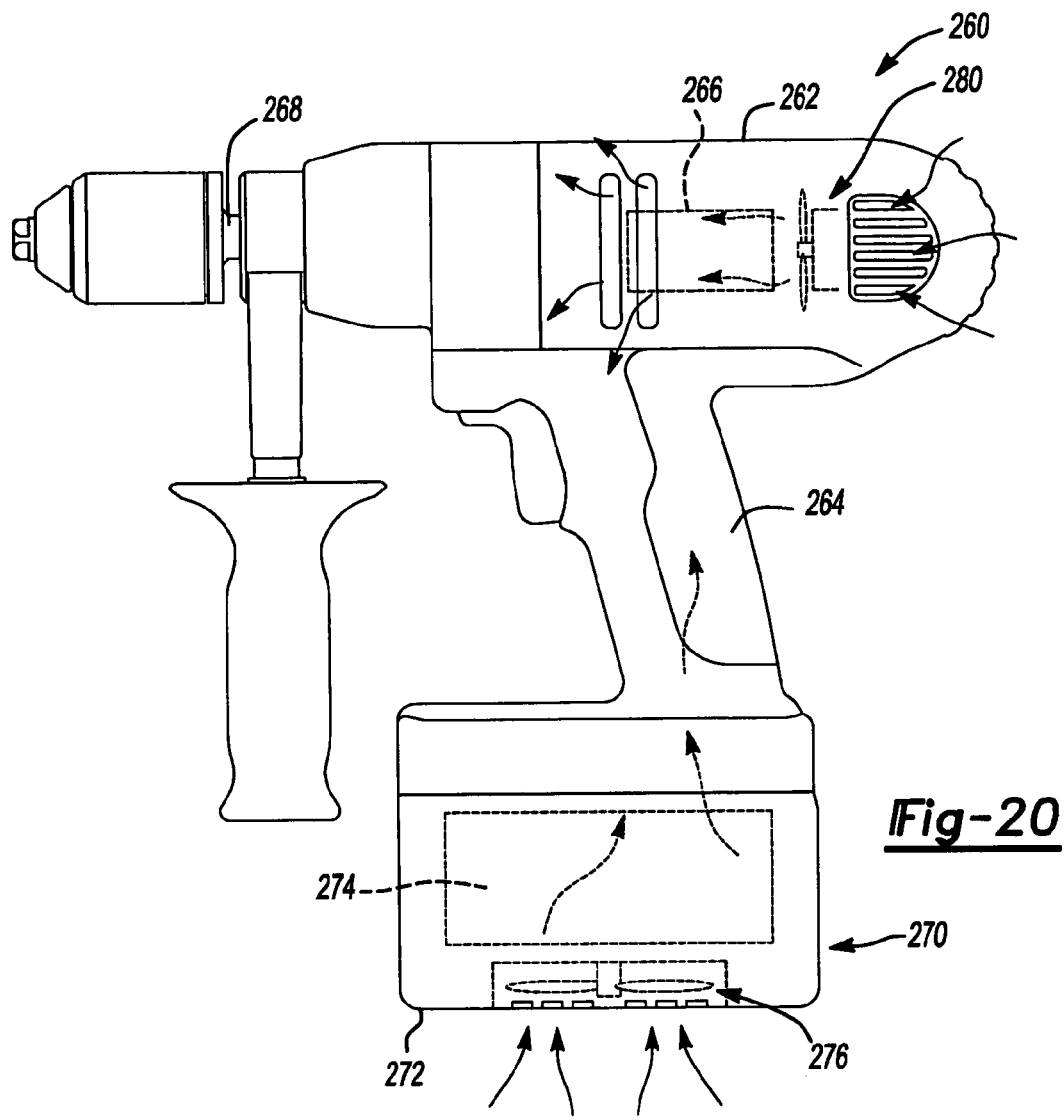
FIG. 20 is a schematic diagram of a power tool including a fan provided in the battery pack for cooling a cell cluster within the battery pack and a separate fan for cooling the motor of the power tool.

With reference to FIG. 20, a power tool 260 is provided, including a tool housing 262 including a handle portion 264. A motor 266 and drive mechanism (not illustrated) are disposed in the tool housing 262, as is known in the art. A battery pack 270, including a battery housing 272 is releasably connected to the tool housing 262. The battery pack 270 includes a cell cluster 274 disposed within the housing 272 as well as a fan 276. Preferably, the fan 276 is a DC motor fan that is controlled by a controller provided within the battery pack which senses a temperature of the cell cluster 274 and activates the fan 276 for cooling the cell cluster once the cell cluster reaches a predetermined temperature. The fan 276 draws air into the housing 272 of the battery pack 270. The housing 272 can be configured with vents in order to control the air flow through the battery pack 270 such that air can be expelled into the tool housing 262 to be utilized for additional cooling of the motor 266, or can alternatively be designed to expel the air into the ambient directly from the battery pack housing 272. An additional DC motor driven fan 280 or a fan coupled to the tool drive motor can optionally be provided within the tool housing 262 for providing direct cooling for the motor 266.

Figure 21:
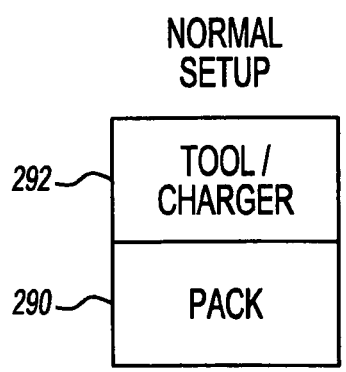
FIG. 21 is a schematic illustration of a standard battery pack and tool/charger system.

With reference to FIG. 21, a schematic illustration of a battery pack 290 attached to either a tool or a battery charger 292 is shown. During this normal setup, the battery pack is directly connected to the tool/charger.

Figure 22A:
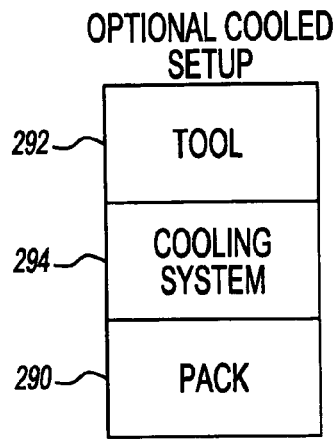
FIG. 22 is a schematic diagram of a tool and charger system in combination with a battery pack and employing a modular cooling system which is detachable to and from the tool/charger and/or battery pack for providing selective cooling to the battery pack when needed.
Figure 22C:
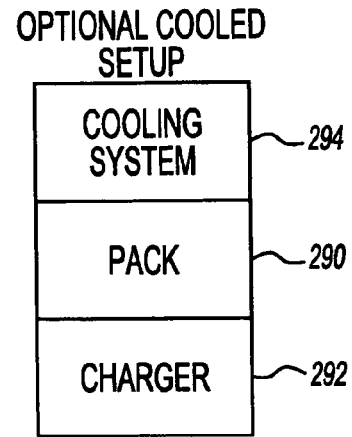
Figure 22B:
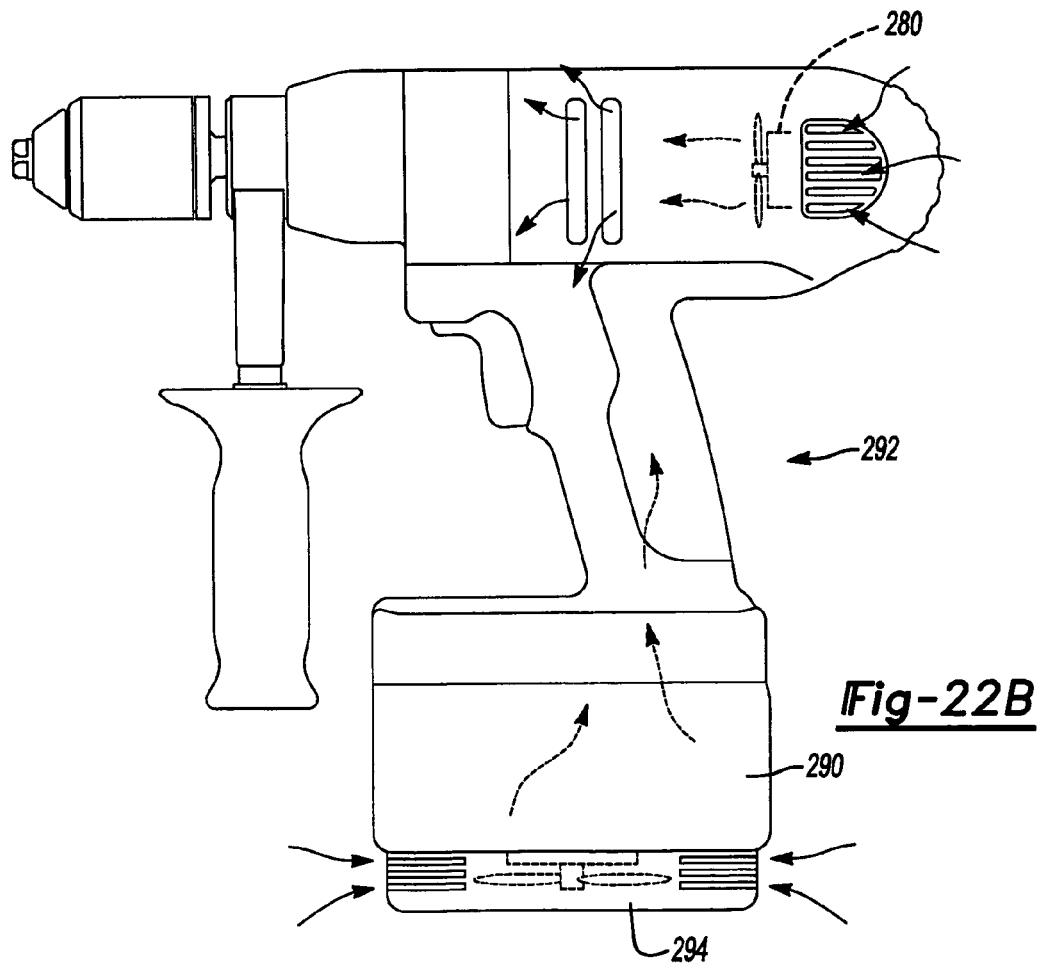

With reference to FIG. 22A, a modular cooling system is provided including an optional cooling system 294 that can be mounted to the tool/charger 292 or to the pack 290, or both. As illustrated in FIG. 22B, the cooling system 294 includes a fan unit disposed within the cooling system pack for blowing air through the battery pack 290 for cooling cells therein. The cooling system 294 is removable from the battery pack 290 so that in lighter duty applications, the tool 292 and battery pack 290 can be utilized without the cooling system 294. However, in heavy applications, the cooling system 294 can be snapped onto the tool 292 or pack 290 for providing desired cooling of the cells within the battery pack 290. In addition, when the battery pack 290 is placed on a charger 292 (in FIG. 22C), the cooling system 294 can be employed for blowing air through the pack in order to cool the cells within the pack 290. The modular arrangement of the cooling system 294 allows the cooling system 294 to be sold as a separate item or as a kit with a tool, charger, and pack system.

It should be noted that the modular cooling system 294 can also take the form of a heat sink or other active cooling systems, such as a fluid cooling system as disclosed above, which can be removably mounted to the pack 290 or tool/charger 292.

With reference to FIG. 23, a battery pack 300 is provided including a housing 302 in which a cell cluster 304 is disposed. A rheological fluid 306 is provided in the housing 302 and surrounds the cell cluster 304. The Theological fluid has good heat conducting characteristics and, as is known in the art, when a magnetic field is applied to the rheological fluid, the rheological fluid changes from a generally liquid state to a solid state. Accordingly, a conductor coil 308 is provided within the housing 302 to generate a pulsing magnetic field to cause the rheological fluid 306 to alternate solid and liquid states that causes it to circulate around the cell cluster 304. The circulating rheological fluid 306 withdraws heat from the cell cluster and provides cooling thereof.

With reference to FIG. 24, a battery pack control circuit is provided within the battery pack 310 which includes a plurality of cells 312. The circuit includes a thermistor 314 which detects the temperature of the cells 312 and opens a switch, breaker, or MOSFET, etc. 316, in order to disable the electrical connection with the cells 312 in order to disable the battery pack 310 from discharging or charging the cells. Thus, with the circuit provided within the pack 310, the control circuit ensures that the batteries 312 cannot continue to be charged or discharged when a temperature of the battery cells exceed a predetermined temperature.

With reference to FIGS. 25 and 26, a battery pack 320 is schematically shown including a plurality of cells 322 employing a circuit, including a thermistor 324 which senses a temperature of the cells 322 and provides an appropriate signal to a temperature gauge 326 which is mounted on the exterior surface of the housing 328 of the battery pack 320. The temperature gauge 326 (shown in FIG. 26) shows the user when the pack is getting too hot for continued use. The temperature gauge 326 provided on the battery pack 320 can be used in combination with other cooling techniques provided in the present disclosure for indicating to a user that the cooling technique needs to employed. In particular, the technique illustrated in FIG. 2 in which fluid cooling is provided to the battery pack via a stored fluid chamber and pump system that swaps the warm fluid within the pack with a cooler fluid can be utilized. Furthermore, attaching the pack to the charger as illustrated in FIG. 5 so that compressed air can be utilized for cooling the pack for continued use by the operator. The gauge can also be utilized in combination with the system disclosed in FIG. 19 as an indicator to the user that the batteries need to be manually moved or swapped to a cooler position within the battery pack. This system can also be utilized with the system disclosed in FIGS. 22A and 22B to indicate to a user that a modular cooling system needs to be added to the battery pack in order to actively cool the cells within the pack.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A cordless power tool, comprising:
   a tool housing;
   a motor mounted to said tool housing;
   a tool electronic control disposed within said tool housing, said tool electronic control configured to perform a programmed operation; and
   a battery pack connected to said tool housing, said battery pack including a battery electronic control connectable to said tool electronic control.

2. The cordless power tool according to claim 1, wherein said tool electronic control is powered by a power supply in said battery pack.

3. The cordless power tool according to claim 1, further comprising a switch disposed on said tool housing wherein activation of said switch causes said battery electronic control to change from a dormant mode of operation to an active mode of operation.

4. The cordless power tool according to claim 1, further comprising a battery charger unit including a charger electronic control that is connectable to said battery electronic control.

5. The cordless power tool according to claim 1, further comprising a temperature sensor in said battery pack, said temperature sensor providing a temperature signal to said battery electronic control.

6. The cordless power tool according to claim 5, wherein said temperature sensor is connectable to said tool electronic control for providing said temperature signal to said tool electronic control.

7. The cordless power tool according to claim 1, further comprising a battery pack identification component including stored information regarding battery characteristics.

8. The cordless power tool according to claim 7, wherein said battery pack identification component is connectable to said tool electronic control for providing said stored information regarding battery characteristics to said tool electronic control.

9. The cordless power tool according to claim 7, wherein said battery pack identification component is connectable to a charger electronic control for providing said stored information regarding battery characteristics to said charger electronic control.

10. The cordless power tool according to claim 1, wherein said battery electronic control controls a pulse width modulated duty cycle of current delivered by said at least one battery to said motor to control a speed of said motor.

11. A cordless power tool, comprising:
    a tool housing;
    a motor mounted to said tool housing;
    a tool electronic control disposed within said tool housing;
    a battery pack connected to said tool housing, said battery pack including a battery electronic control connectable to said tool electronic control; and
    a temperature sensor in said battery pack, said temperature sensor providing a temperature signal to said baterry electronic control, said temperature sensor connectable to said tool electronic control for providing said temperature signal to said tool electronic control.

12. The cordless power tool according to claim 11, wherein said tool electronic control is powered by a power supply in said battery pack.

13. The cordless power tool according to claim 11, further comprising a switch disposed on said tool housing wherein activation of said switch causes said battery electronic control to change from a dormant mode of operation to an active mode of operation.

14. The cordless power tool according to claim 11, further comprising a battery charger unit including a charger electronic control that is connectable to said battery electronic control.

15. The cordless power tool according to claim 11, further comprising a battery pack identification component including stored information regarding battery characteristics.

16. The cordless power tool according to claim 15, wherein said battery pack identification component is connectable to said tool electronic control for providing said stored information regarding battery characteristics to said tool electronic control.

17. The cordless power tool according to claim 15, wherein said battery pack identification component is connectable to a charger electronic control for providing said stored information regarding battery characteristics to said charger electronic control.

18. The cordless power tool according to claim 11, wherein said battery electronic control controls a pulse width modulated duty cycle of current delivered by said at least one battery to said motor to control a speed of said motor.

19. A cordless power tool, comprising:
    a tool housing;
    a motor mounted to said tool housing;
    a tool electronic control disposed within said tool housing, said tool electronic control configured to perform a programmed operation;
    a battery pack connected to said tool housing, said battery pack including a battery electronic control connectable to said tool electronic control; and
    a battery pack identification component including stored information regarding battery characteristics, said battery pack identification component connectable to said tool electronic control for providing said stored information regarding battery characteristics to said tool electronic control.

20. The cordless power tool according to claim 19, wherein said tool electronic control is powered by a power supply in said battery pack.

21. The cordless power tool according to claim 19, further comprising a switch disposed on said tool housing wherein activation of said switch causes said battery electronic control to change from a dormant mode of operation to an active mode of operation.

22. The cordless power tool according to claim 19, further comprising a battery charger unit including a charger electronic control that is connectable to said battery electronic control.

23. The cordless power tool according to claim 19, further comprising a temperature sensor in said battery pack, said temperature sensor providing a temperature signal to battery electronic control.

24. The cordless power tool according to claim 23, wherein said temperature sensor is connectable to said tool electronic control for providing said temperature signal to said tool electronic control.

25. The cordless power tool according to claim 19, wherein said battery pack identification component is connectable to a charger electronic control for providing said stored information regarding battery characteristics to said charger electronic control.

26. The cordless power tool according to claim 19, wherein said battery electronic control controls a pulse width modulated duty cycle of current delivered by said at least one battery to said motor to control a speed of said motor.

* * * * *